Oct. 30, 1962   N. T. MIGDAL ETAL   3,060,722
DEVICE FOR DETECTING SMALL QUANTITIES OF GAS IN A LIQUID
Filed Jan. 11, 1960

*INVENTORS*
NICHOLAS T. MIGDAL
BY DONALD R. FELLER

ATTORNEY

United States Patent Office

3,060,722
Patented Oct. 30, 1962

3,060,722
DEVICE FOR DETECTING SMALL QUANTITIES OF GAS IN A LIQUID
Nicholas T. Migdal, Monrovia, and Donald R. Feller, Covina, Calif., assignors to Aerojet-General Corporation, Azusa, Calif., a corporation of Ohio
Filed Jan. 11, 1960, Ser. No. 1,516
3 Claims. (Cl. 73—19)

This invention relates to devices for detecting the presence of gases entrained in flowing liquids.

In its principal aspect, the present invention comprises a device in the flow path of a highspeed large volume liquid pumping system for causing a rotation of the liquid being pumped. This rotation in the flow lines causes a concentration of the less dense fluid along with any tiny bubbles present in the liquid in the center of the liquid flow path. In addition, the device causes a drop in the pressure of the liquid so any bubbles present in the liquid increase in size and can be more easily detected. A tube is positioned at the center of the flow path for receiving the less dense fluid along with the bubbles. This tube conducts the less dense fluid and any bubbles to a first orifice which is small enough so that the bubbles to be detected are a substantial fraction of the size of the orifice. This orifice opens into a chamber. A second orifice in the chamber opens into the ambient air. Pressure detecting means are positioned in the chamber so that each time the bubble passes through the first orifice it causes a momentary rise in the pressure in the chamber which is detected by the pressure indicator.

It is therefore a principal object of the present invention to provide a novel method and improved means for detecting gases which are entrained within a flowing liquid stream.

Figure 1:
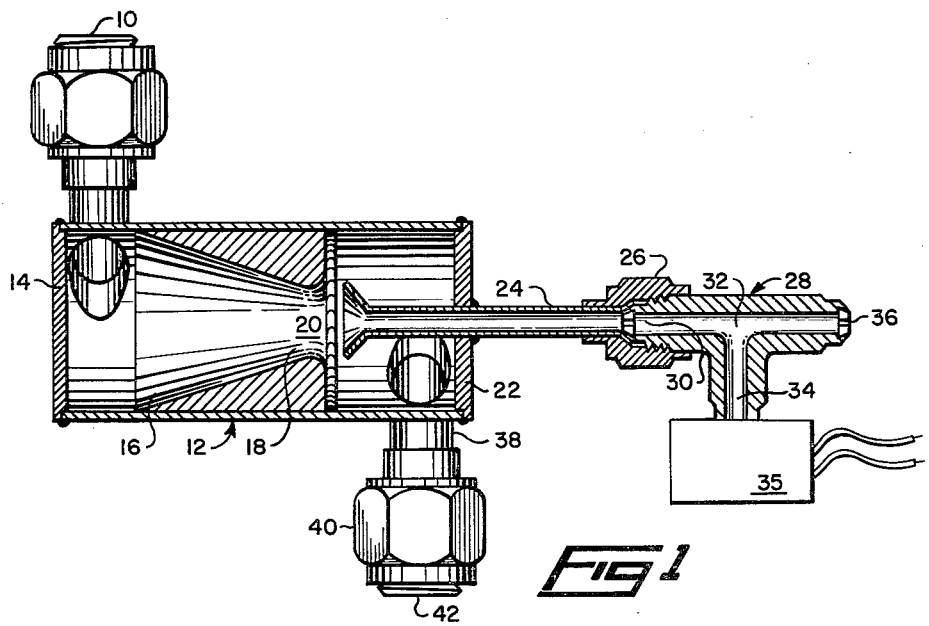
Figure 2:
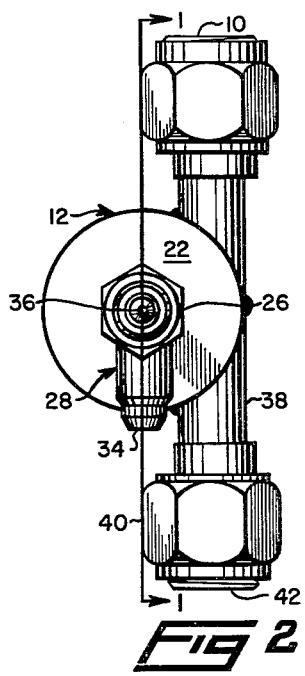

These and other objects, aspects, features, and advantages of the present invention will be apparent to those skilled in the art from the following more detailed description taken in conjunction with the appended drawings wherein;

FIG. 1 is a cross section of an entrained gas detector taken on line 1—1 of FIGURE 2; and, FIGURE 2 is a side elevation of the entrained gas detector of FIGURE 1.

Referring now to the figures, a fluid flow inlet 10 is arranged in a cylindrical body member 12, through which the fluid to be monitored enters a separator chamber 16 tangentially and at right angles to the direction of flow through the chamber. The swirl thus imparted to the liquid is increased by the provision of a venturi nozzle 18 at the exit of the separator chamber 16. This arrangement concentrates any gas bubbles present in the liquid along with the less dense portions of the liquid in the center of the flow path, which in this embodiment is the center of chamber 16.

The mouth of a bleed tube 24 faces the venturi nozzle 18 at the center of the chamber 16. Consequently, any gas bubbles present in the liquid, along with the less dense portions of the liquid, enter the bleed tube. In addition, as shown in FIG. 1, the main fluid flow inlet into chamber 16 and the main fluid outlet 42 are both at right angles to the direction of flow through the chamber. This arrangement absorbs a substantial amount of the energy in the flowing liquid, thereby causing a substantial drop in pressure in chamber 16. This pressure drop causes any tiny bubbles present in the liquid to grow in size so they may be more easily detected. In this way, the device is made more sensitive. As shown in FIG. 1, the venturi nozzle 18 is secured inside the circular body 12 which is sealed at its separator chamber end by a plug 14 and closed at its other end by a head plate 22 having the centrally disposed bleed tube 24. As a result, liquid along with any gas bubbles which may be present therein, travel through the bleed tube 22 and through a first entrance orifice 30. This entrance orifice opens into a chamber 32 formed in a T-shaped housing 28 which is secured to the bleed tube 24 by a sleeve nut 26. Orifice 30 is small enough so the size of the bubbles to be detected is a substantial fraction of the size of the orifice. Chamber 32 is provided with an exit orifice 36 communicating with the ambient air. The size of the exit orifice 36 is comparable to the size of the exit orifice 30. The stem of the assembly 28 is provided with a passage communicating with chamber 32. This passage is also provided with an outlet 34. A pressure responsive switch 35 or some other suitable pressure gage is connected through the outlet 34.

To understand the operation of the device, it is noted that the pressure loss across any orifice is proportional to the fluid density passing through the orifice and to the square of the stream velocity. As a result, if a tiny gas bubble should be entrained with the liquid and pass through bleed tube 24, its passage through entrance orifice 30 momentarily decreases the fluid density passing through the orifice. Consequently, the pressure loss across orifice 30 would be momentarily decreased. Since, however, orifice 36 communicates with the ambient air, the pressure loss between the fluid in bleed tube 24 and the ambient air must always be constant. Therefore it can be seen that if the pressure loss across entrance orifice 30 decreases, then the pressure loss across exit orifice 36 must increase to maintain the overall pressure differential between the fluid in the bleed tube and the ambient air. In other words, if the overall pressure differential cannot change, then the pressure in chamber 32 must increase, and this increase in pressure is proportional to the reduction in density of the fluid passing through the orifice 30.

As stated above, a single tiny bubble entrained with the liquid and moving through bleed tube 24 and through orifice 30 causes a momentary rise in pressure in chamber 32. This momentary rise in pressure causes the pressure switch 35 to close or in the event another kind of pressure gage is secured to outlet 34, the response of the pressure gage momentarily indicates the presence of a bubble. In the event a pressure responsive switch 35 is used, a suitable holding circuit may be provided to keep the contacts of the pressure switch closed on the passage of only a single tiny gas bubble through orifice 30. These contacts in the pressure responsive switch 35 may actuate a suitable indicator, such as a lamp.

It is to be understood that the form of the invention herewith shown and described is to be taken as a preferred example of the same, and that various changes in the shape, size and arrangement of the parts may be resorted to without departing from the spirit of this invention or the scope of the claims.

We claim:
1. A device for the detection of infrequent randomly occuring tiny gas bubbles in a large volume high speed liquid pumping system comprising a liquid flow path, means in said liquid flow path for separating the liquid in accordance with its density whereby any gas bubbles present in the liquid form a less dense liquid and are thereby concentrated in a predetermined region of the flow path, means in said flow path for diverting the less dense liquid into a separate path, a first orifice in said separate path comparable in size to the size of the bubbles to be detected, a chamber, said first entrance orifice opening into said chamber, a second exit orifice in said chamber comparable in size to the first orifice and communicating with the ambient air, and pressure responsive means communicating with said chamber whereby a bubble entrained in said liquid and passing through said first orifice momentarily decreases the density of flow through the orifice, thereby causing a momentary increase in pressure in said chamber and causing an indication in the pressure responsive means.

2. A device for the detection of infrequent randomly occuring tiny gas bubbles in a large volume high speed pumping system comprising a main liquid flow path, means in said main liquid flow path for imparting a rapid rotational movement to the liquid as it moves in said flow path whereby any gas bubbles present in the liquid are concentrated with the less dense liquid at the center of the flow path, means in the center of said flow path for diverting the less dense liquid into a separate path, a first entrance orifice in said separate path comparable in size to the size of the bubbles to be detected, a chamber, said first entrance orifice opening into said chamber, a second exit orifice in said chamber comparable in size to the first orifice and communicating with the ambient air, and pressure responsive means communicating with said chamber whereby a bubble entrained in said liquid and passing through said first orifice momentarily decreases the density of flow through the orifice, thereby causing a momentary increase in pressure in said chamber and producing an indication in the pressure responsive means.

3. A device for the detection of infrequent randomly occuring tiny gas bubbles in a large volume high speed pumping system comprising a main liquid flow path, combined means in said main liquid flow path both for imparting a rapid rotational movement to the liquid as it moves in said flow path whereby any gas bubbles present in the liquid are concentrated with the less dense liquid at the center of the flow path, and for causing a substantial drop in the pressure of the liquid whereby the size of the gas bubbles present in the liquid are increased and the detecting device is made more sensitive, means in the center of said flow path for diverting the less dense liquid into a separate path, a first entrance orifice in said separate path, said entrance orifice small enough so the size of the bubbles to be detected is a substantial fraction of the size of the orifice, a chamber, said first entrance orifice opening into said chamber, a second exit orifice in said chamber comparable in size to the first orifice and communicating with the ambient air, and pressure responsive means communicating with said chamber whereby a bubble entrained in said liquid and passing through said first orifice momentarily decreases the density of the liquid flowing through the orifice, thereby causing a momentary increase in pressure in said chamber and producing an indication in the pressure responsive means.

References Cited in the file of this patent
UNITED STATES PATENTS

| | | |
|---|---|---|
| 2,306,606 | Hirsch | Dec. 29, 1942 |
| 2,765,867 | Revallier | Oct. 9, 1956 |